US012567580B2

(12) United States Patent (10) Patent No.: US 12,567,580 B2

He et al. (45) Date of Patent: Mar. 3, 2026

---

(54) TERNARY POSITIVE ELECTRODE ACTIVE MATERIAL AND LITHIUM-ION BATTERY HAVING SAME

(71) Applicant: CALB Co., Ltd., Jiangsu (CN)

(72) Inventors: Minghua He, Changzhou (CN); Xiaoyang Zhang, Changzhou (CN); Kang Li, Changzhou (CN); Yang Wang, Changzhou (CN); Xuyi Shan, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 509 days.

(21) Appl. No.: 18/154,842

(22) Filed: Jan. 15, 2023

(65) Prior Publication Data

US 2024/0162419 A1 May 16, 2024

(30) Foreign Application Priority Data

Nov. 14, 2022 (CN) .......................... 202211417055.3

(51) Int. Cl.
H01M 4/36 (2006.01)
H01M 4/02 (2006.01)
H01M 10/0525 (2010.01)

(52) U.S. Cl.
CPC ....... H01M 4/366 (2013.01); H01M 10/0525 (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 11,078,089 B2 | 8/2021 | Choi et al. | |
| 2020/0028169 A1 | 1/2020 | Wu et al. | |
| 2022/0185695 A1* | 6/2022 | Dou ...................... | H01M 4/505 |
| 2024/0194852 A1* | 6/2024 | Yoo ........................ | C01G 53/50 |

FOREIGN PATENT DOCUMENTS

| | | |
|---|---|---|
| CN | 110858649 | 3/2020 |
| CN | 111916727 | 11/2020 |
| CN | 114204011 | 3/2022 |

(Continued)

OTHER PUBLICATIONS

Derwent Abstract of EP-3613705-A2 (Year: 2019).*

(Continued)

*Primary Examiner* — Kevin M Bernatz
(74) *Attorney, Agent, or Firm* — JCIP GLOBAL INC.

(57) ABSTRACT

The disclosure relates to the field of lithium-ion batteries and discloses a ternary positive electrode active material in a form of particles, and an area of 1 nm to 1,000 nm in a direction from an outermost surface to a center in a cross-section of each of the particles is defined as an outer layer, and the rest in the cross-section of each of the particles is defined as an inner layer. The inner layer is doped with a first metal element M, the outer layer is doped with a second metal element N, and a valence state of the first metal element M is lower than a valence state of the second metal element N. The center of the ternary active material particles is doped with the first metal element M in a low-valence state.

9 Claims, 2 Drawing Sheets

(56)    References Cited

FOREIGN PATENT DOCUMENTS

| CN | 115000383 | 9/2022 | |
| EP | 3613705 | 2/2020 | |
| EP | 3613705 A2 * | 2/2020 | ........ H01M 10/0525 |

OTHER PUBLICATIONS

"Search Report of Europe Counterpart Application", issued on Aug. 16, 2023, p. 1-p. 7.
Office Action of China Counterpart Application, with English translation thereof, issued on Feb. 8, 2023, pp. 1-14.
"Decision of Refusal of China Counterpart Application", issued on Mar. 1, 2023, with English translation thereof, pp. 1-13.
"Examination Report of India Counterpart Application", issued on Dec. 3, 2025, p. 1-p. 7.

* cited by examiner

TERNARY POSITIVE ELECTRODE ACTIVE MATERIAL AND LITHIUM-ION BATTERY HAVING SAME

CROSS-REFERENCE TO RELATED APPLICATION

This application claims the priority benefit of China application no. 202211417055.3, filed on Nov. 14, 2022. The entirety of the above-mentioned patent application is hereby incorporated by reference herein and made a part of this specification.

BACKGROUND

Technical Field

The disclosure relates to the field of lithium-ion batteries, and in particular, relates to a ternary positive electrode active material and a lithium-ion battery containing the ternary positive electrode active material.

Description of Related Art

The structural formula of the NCM ternary positive electrode active material is generally $LiNi_xCo_yMn_{1-x-y}$ ($0<x<1, 0<y<1, 0<x+y<1$). The NCM ternary positive active material has a similar crystal structure to $LiCoO_2$, both of which are in the R-3m space group of the layered hexagonal $\alpha$-$NaFeO_2$. Transition metals, lithium, and oxygen occupy the 3a, 3b, and 6c positions, respectively (as shown in FIG. 1, the white circles are the oxygen at the 6c position, the hatched circle is the transition metal at the 3a position, and the black ball is the $Li^+$ at the 3b position). The transition metal ions and the surrounding oxygen form a $MO_6$-hedral structure, and the lithium and its surrounding oxygen form a $LiO_6$ octahedral structure. From a structural point of view, lithium ions are located in the middle of the $MO_6$ octahedral layer and can be freely extracted and intercalated during charging and discharging.

Ternary materials usually face problems such as low charging and discharging efficiency, low high-temperature storage performance, low electrical conductivity, poor cycle performance, and reduced energy density due to agglomeration. In order to improve the performance of ternary materials, in practical applications, ternary materials are usually modified by being doped with modifying elements, mixed with active materials, and mixed with inactive materials as well as by coating, precursor regulation, and stoichiometric ratio regulation.

Doping is a modification method that introduces other metal or non-metal atoms into the ternary positive electrode material crystal. For lithium composite oxides of nickel, cobalt, and manganese, it mostly refers to the substitution of some atoms of nickel, cobalt, and manganese.

By doping some metal ions (e.g., Li, Al, Fe, Cr, Ce, Mg, etc.) and non-metal ions (F, Si, etc.) in the ternary material lattice, the electronic conductivity and ion conductivity can be improved, and the output power density of the battery can also be enhanced. Moreover, the stability (especially thermal stability) of the ternary material structure can be improved as well. Although the equivalent state doping of cations will not change the valence of nickel-cobalt-manganese transition metal ions, the structure of the material can be stabilized, and the ion channels can be expanded, and the ionic conductivity of the ternary material is thereby improved. When inequivalent cations are used for doping, the valence state of transition metal ions in the ternary material will increase or decrease. As such, holes or electrons are generated, the energy band structure of the material changes, and the intrinsic electronic conductivity thereof is thereby increased.

Doping can improve the structural stability of ternary materials. However, the selection of doping elements, control of doping depth, optimization of doping amount, and doping methods are all critical to the structure and performance of materials. Therefore, it is still difficult to achieve high discharging specific capacity and structural stability at the same time. Various transition metal ions have different properties, so in the ternary positive electrode materials, there is a trade-off relationship among specific capacity, structural stability, and thermodynamic stability. Therefore, it is necessary to seek a more effective doping approach to further improve the performance of ternary positive electrode materials.

SUMMARY

The disclosure provides a ternary positive electrode material.

The disclosure provides a ternary positive electrode active material in a form of particles, and an area of 1 nm to 1,000 nm in a direction from an outermost surface to a center in a cross-section of each of the particles is defined as an outer layer, and the rest area in the cross-section of each of the particles is defined as an inner layer. The inner layer is doped with a first metal element M, the outer layer is doped with a second metal element N, and a valence state of the first metal element M is lower than a valence state of the second metal element N. The first metal element M is selected from one or more of Na, K, Mg, Al, Zn, Cu, and Ca, and the second metal element N is selected from one or more of W, Ta, Nb, Mo, Tc, Ru, Rh, Pd, and Sb.

In another aspect, the disclosure provides a lithium-ion battery including the ternary positive electrode active material described in the disclosure.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
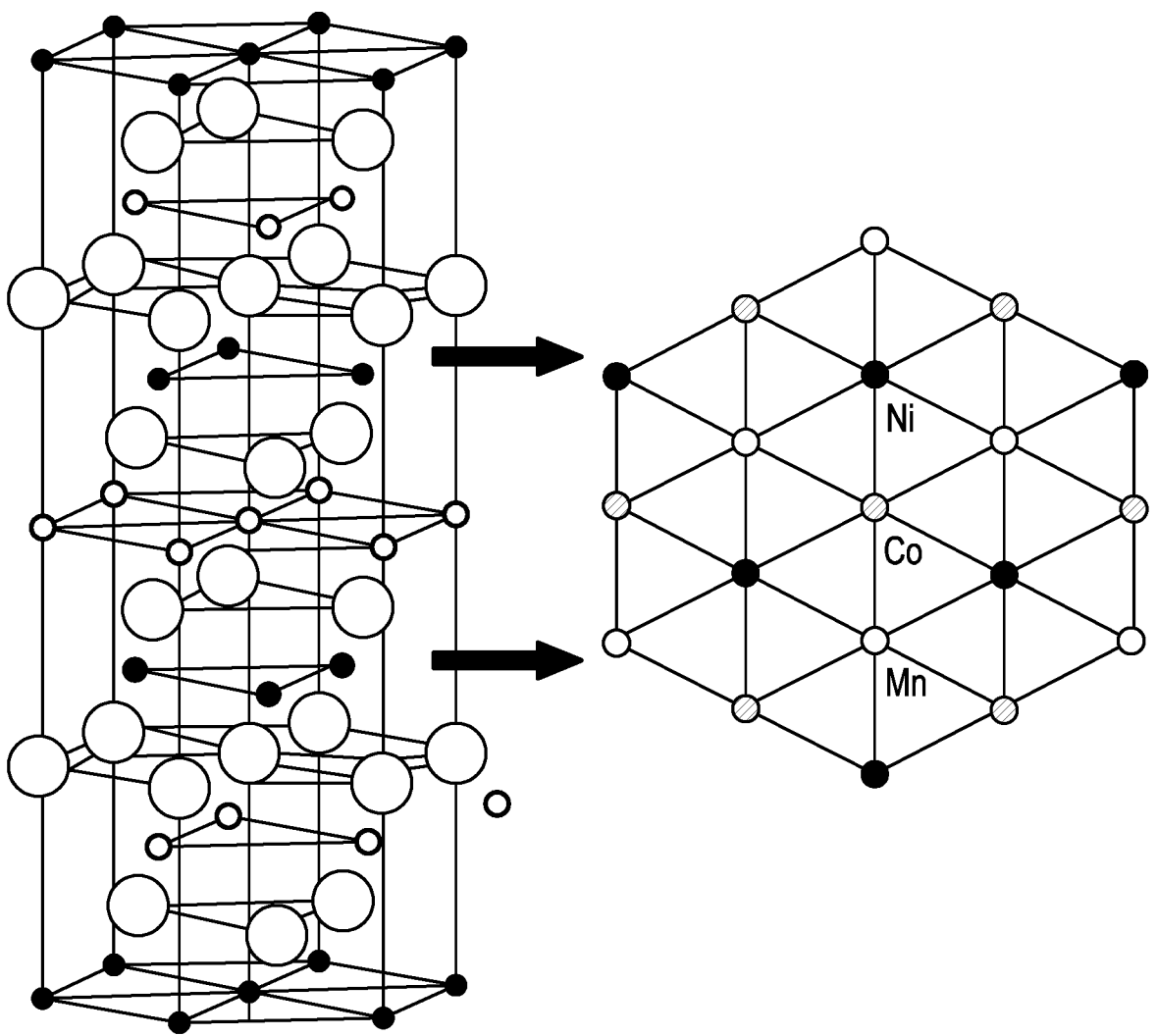
FIG. 1 is a diagram of a crystal structure of $\alpha$-$NaFeO_2$.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

In the disclosure, the center of the ternary active material particles is doped with the first metal element M in a low-valence state. Since the low-valence state doping element M is close to the ionic radius of $Li^+$, $Li^+$ sites are occupied, the lithium-nickel intermixing is weakened, supporting is provided, and the structure of the material is stabilized. The outer layer of the ternary active material particles is doped with the high-valence state second metal element N, and the high-valence state doping element N preferentially occupies Ni sites. By enhancing the TM-O bond strength and inhibiting the formation of oxygen vacancies, the structural stability is enhanced, and the lattice oxygen precipitation is reduced.

In the disclosure, due to the improved doping of the ternary positive electrode active material, the lithium battery provided by the disclosure has a higher initial gram capacity and has higher high-temperature cycle performance and high-temperature storage performance.

Figure 2:
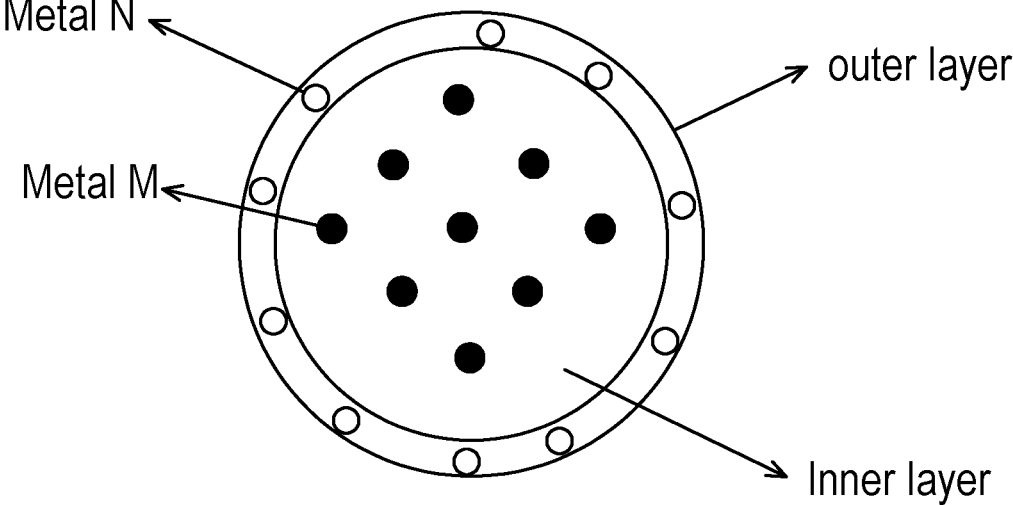
FIG. 2 is a structural schematic diagram of a ternary positive electrode active material according to the disclosure.

The disclosure provides a ternary positive electrode active material in a form of particles, and an area of 1 nm to 1,000 nm in a direction from an outermost surface to a center in a cross-section of each of the particles is defined as an outer layer, and the rest area in the cross-section of each of the particles is defined as an inner layer. The inner layer is doped with a first metal element M, the outer layer is doped with a second metal element N, and a valence state of the first metal element M is lower than a valence state of the second metal element N. The structural schematic diagram is shown in FIG. 2. The first metal element M is selected from one or more of Na, K, Mg, Al, Zn, Cu, and Ca, and the second metal element N is selected from one or more of W, Ta, Nb, Mo, Tc, Ru, Rh, Pd, and Sb. The second metal element N can increase the binding energy with oxygen and inhibit the release of oxygen from the positive electrode.

Compared with the existing single element doping modification, in the disclosure, the inner layer of the ternary active material is doped with an appropriate content of low-valence metal element M, so that an appropriate amount of $Li^+$ sites are occupied, the lithium-nickel intermixing is weakened, supporting is provided, and the structure of the material is stabilized. By doping the outer layer of the ternary active material with an appropriate content of high-valence metal element N, the strength of the TM-O bond can be enhanced, the formation of oxygen vacancies can be suppressed, the structural stability is enhanced, and the oxygen precipitation of the lattice is reduced.

As a further improvement of the above technical solution, the first metal element M is aluminum, magnesium, and zinc, and the second metal element N is tungsten, molybdenum, and titanium.

As a further improvement of the above technical solution, a mass content of the first metal element M in the ternary positive electrode material is 1,000 ppm to 3,000 ppm, preferably 1,500 ppm to 2,500 ppm. When the mass content of the first metal doping element M is lower than 1,000 ppm, the limiting effect on lithium-nickel intermixing may be weakened, and the performance of the battery may be lowered. If the mass content is higher than 3,000 ppm, the content of the first metal doping element M may replace Li site elements more, the capacity may decrease, and lithium diffusion may be hindered.

As a further improvement of the above technical solution, a mass content of the second metal element N in the ternary positive electrode material is 500 ppm to 2,500 ppm, preferably 700 ppm to 1,800 ppm. When the mass content of the second metal doping element N is lower than 500 ppm, the stability of the structure and the confinement effect on lattice oxygen precipitation may both be weakened, and the cycle storage performance of the battery may be reduced. The mass content of the second metal doping element N being higher than 2,500 ppm may increase the disorder of the structure.

As a further improvement of the above technical solution, a D50 of the particle is 2.0 μm to 8.0 μm. In the ternary positive electrode active material, the area of 1 nm to 1,000 nm in the direction from the outermost surface to the center in a cross-section of each of the particles is defined as the outer layer, and the rest area in the cross-section of each of the particles is defined as the inner layer.

As an improvement of the above technical solution, a BET specific surface area of the particle is 0.3 $m^2$/g to 1.3 $m^2$/g.

Example 1

A positive electrode active material precursor [$Ni_x$-$Co_y$$Mn_{1-x-y}$](OH)$_2$, $LiOH_2$, and $Al_2O_3$ were added into a mixer for mixing, where the Li/Me molar ratio was 1.05, and Me represented the sum of the molar masses of Ni, Co, and Mn in the positive electrode active material precursor. $Al_2O_3$ was added in an amount such that the Al content in the inner layer of the positive electrode material was 1,000 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and $WO_2$ were added to the mixer for mixing, where the amount of $WO_2$ added was such that the W content in the outer layer of the positive electrode material was 500 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 2.0 μm.

Example 2

A positive electrode active material precursor [$Ni_xCo_y$, $M_{1-x-y}$](OH)$_2$, LiOH$_2$, and Al$_2$O$_3$ were added into a mixer for mixing, where the Li/Me molar ratio was 1.05, and Me represented the sum of the molar masses of Ni, Co, and Mn in the positive electrode active material precursor. Al$_2$O$_3$ was added in an amount such that the Al content in the inner layer of the positive electrode material was 2,000 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and WO$_2$ were added to the mixer for mixing, where the amount of WO$_2$ added was such that the W content in the outer layer of the positive electrode material was 1,500 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 5.0 μm.

Example 3

A positive electrode active material precursor [$Ni_xCo_y$, $M_{1-x-y}$](OH)$_2$, LiOH$_2$, and Al$_2$O$_3$ were added into a mixer for mixing, where the Li/Me molar ratio was 1.05, and Me represented the sum of the molar masses of Ni, Co, and Mn in the positive electrode active material precursor. Al$_2$O$_3$ was added in an amount such that the Al content in the inner layer of the positive electrode material was 3,000 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and WO$_2$ were added to the mixer for mixing, where the amount of WO$_2$ added was such that the W content in the outer layer of the positive electrode material was 2,500 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 8.0 μm.

Example 4

A positive electrode active material precursor [$Ni_xCo_y$, $M_{1-x-y}$](OH)$_2$, LiOH$_2$, and Al$_2$O$_3$ were added into a mixer for mixing, where the Li/Me molar ratio was 1.05, and Me represented the sum of the molar masses of Ni, Co, and Mn in the positive electrode active material precursor. Al$_2$O$_3$ was added in an amount such that the Al content in the inner layer of the positive electrode material was 1,500 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and WO$_2$ were added to the mixer for mixing, where the amount of WO$_2$ added was such that the W content in the outer layer of the positive electrode material was 700 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 3.0 μm.

Example 5

A positive electrode active material precursor [$Ni_xCo_y$, $M_{1-x-y}$](OH)$_2$, LiOH$_2$, and Al$_2$O$_3$ were added into a mixer for mixing, where the Li/Me molar ratio was 1.05, and Me represented the sum of the molar masses of Ni, Co, and Mn in the positive electrode active material precursor. Al$_2$O$_3$ was added in an amount such that the Al content in the inner layer of the positive electrode material was 2,500 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and WO$_2$ were added to the mixer for mixing, where the amount of WO$_2$ added was such that the W content in the outer layer of the positive electrode material was 1,800 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 6.0 μm.

Comparative Example 1

A positive electrode active material precursor [$Ni_xCo_y$, $M_{1-x-y}$](OH)$_2$, LiOH$_2$, and NaOH were added into a mixer for mixing, where the Li/Me molar ratio was 1.05, and Me represented the sum of the molar masses of Ni, Co, and Mn in the positive electrode active material precursor. NaOH was added in an amount such that the Na content in the inner layer of the positive electrode material was 2,500 ppm. The mixture was sintered in an oxygen atmosphere sintering furnace, sintered at 400° C. for 4 h, and then heated to 850° C. for 12 h. After crushing and screening, positive electrode particles doped with Na in the inner layer were obtained.

The positive electrode particles doped with Na in the inner layer and ZrO$_2$ were added to the mixer for mixing, where the amount of ZrO$_2$ added was such that the W content in the outer layer of the positive electrode material was 1,800 ppm. The mixture was sintered in an oxygen atmosphere sintering furnace, sintered at 400° C. for 4 h, and then heated to 750° C. for 10 h. After crushing and screening, positive electrode particles doped with Na in the inner layer and doped with Zr in the outer layer were obtained. The particle size D50 of each particle was 4.0 μm.

Comparative Example 2

A positive electrode active material precursor [$Ni_xCo_y$, $M_{1-x-y}$](OH)$_2$, LiOH$_2$, and ZnO were added into a mixer for mixing, where the Li/Me molar ratio was 1.05, and Me represented the sum of the molar masses of Ni, Co, and Mn in the positive electrode active material precursor. ZnO was added in an amount such that the Zn content in the inner layer of the positive electrode material was 2,500 ppm. The mixture was sintered in an oxygen atmosphere sintering furnace, sintered at 400° C. for 4 h, and then heated to 850° C. for 12 h. After crushing and screening, positive electrode particles doped with Zn in the inner layer were obtained.

The positive electrode particles doped with Zn in the inner layer and $La_2O_3$ were added to the mixer for mixing, where the amount of $La_2O_3$ added was such that the La content in the outer layer of the positive electrode material was 1,800 ppm. The mixture was sintered in an oxygen atmosphere sintering furnace, sintered at 400° C. for 4 h, and then heated to 750° C. for 10 h. After crushing and screening, positive electrode particles doped with Zn in the inner layer and doped with La in the outer layer were obtained. The particle size D50 of each particle was 4.0 μm.

Example 6

A positive electrode active material precursor $[Ni_xCo_y M_{1-x-y}](OH)_2$, $LiOH_2$, and $Al_2O_3$ were added into a mixer for mixing, where the Li/Me molar ratio was 1.05, and Me represented the sum of the molar masses of Ni, Co, and Mn in the positive electrode active material precursor. $Al_2O_3$ was added in an amount such that the Al content in the inner layer of the positive electrode material was 800 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and $WO_2$ were added to the mixer for mixing, where the amount of $WO_2$ added was such that the W content in the outer layer of the positive electrode material was 400 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 5.0 μm.

Example 7

A positive electrode active material precursor $[Ni_xCo_y M_{1-x-y}](OH)_2$, $LiOH_2$, and $Al_2O_3$ were added into a mixer for mixing, where the Li/Me molar ratio was 1.05, and Me represented the sum of the molar masses of Ni, Co, and Mn in the positive electrode active material precursor. $Al_2O_3$ was added in an amount such that the Al content in the inner layer of the positive electrode material was 3,500 ppm. The mixture was sintered in an oxygen atmosphere sintering furnace, sintered at 400° C. for 4 h, and then heated to 850° C. for 12 h. After crushing and screening, positive electrode particles doped with Al in the inner layer were obtained.

The positive electrode particles doped with Al in the inner layer and $WO_2$ were added to the mixer for mixing, where the amount of $WO_2$ added was such that the W content in the outer layer of the positive electrode material was 2,000 ppm. The mixture was sintered in an oxygen atmosphere sintering furnace, sintered at 400° C. for 4 h, and then heated to 750° C. for 10 h. After crushing and screening, positive electrode particles doped with Al in the inner layer and doped with W in the outer layer were obtained. The particle size D50 of each particle was 5.0 μm.

Comparative Example 3

A positive electrode active material precursor $[Ni_xCo_y M_{1-x-y}](OH)_2$, $LiOH_2$, and $WO_2$ were added into a mixer for mixing, where the Li/Me molar ratio was 1.05, and Me represented the sum of the molar masses of Ni, Co, and Mn in the positive electrode active material precursor. $WO_2$ was added in an amount such that the W content in the inner layer of the positive electrode material was 1,500 ppm. The mixture was sintered in an oxygen atmosphere sintering furnace, sintered at 400° C. for 4 h, and then heated to 850° C. for 12 h. After crushing and screening, positive electrode particles doped with W in the inner layer were obtained.

The positive electrode particles doped with W in the inner layer and $Al_2O_3$ were added to the mixer for mixing, where the amount of $Al_2O_3$ added was such that the Al content in the outer layer of the positive electrode material was 2,000 ppm. The mixture was sintered in an oxygen atmosphere sintering furnace, sintered at 400° C. for 4 h, and then heated to 750° C. for 10 h. After crushing and screening, positive electrode particles doped with W in the inner layer and doped in the outer layer of Al were obtained. The particle size D50 of each particle was 5.0 μm.

Comparative Example 4

A positive electrode active material precursor $[Ni_xCo_y M_{1-x-y}](OH)_2$, $LiOH_2$, MgO, and $TiO_2$ were added into a mixer for mixing, where the Li/Me molar ratio was 1.05, and Me represented the sum of the molar masses of Ni, Co, and Mn in the positive electrode active material precursor. MgO was added in an amount such that the Mg content in the inner layer of the positive electrode material was 2,000 ppm, where $TiO_2$ was added in an amount such that the Ti content in the inner layer of the positive electrode material was 1,500 ppm. The mixture was sintered in an oxygen atmosphere sintering furnace, sintered at 400° C. for 4 h, and then heated to 850° C. for 12 h. After crushing and screening, positive electrode particles double-doped with Mg and Ti in the inner layers were obtained. The particle size D50 of each particle was 5.0 μm.

Comparative Example 5

A positive electrode active material precursor $[Ni_xCo_y M_{1-x-y}](OH)_2$ and $LiOH_2$ were added into a mixer for mixing, where the Li/Me molar ratio was 1.05, and Me represented the sum of the molar masses of Ni, Co, and Mn in the positive electrode active material precursor. The mixture was sintered in an oxygen atmosphere sintering furnace, sintered at 400° C. for 4 h, and then heated to 850° C. for 10 h. After crushing and screening, positive electrode particles with no doping in the inner layer were obtained.

The positive electrode particles without doping in the inner layer, MgO, and $TiO_2$ were added into the mixer for mixing, where $TiO_2$ was added in an amount such that the Ti content in the outer layer of the positive electrode material was 1,500 ppm, and MgO was added in an amount such that the Mg content in the inner layer of the positive electrode material was 2,000 ppm. The mixture was sintered in an oxygen atmosphere sintering furnace, sintered at 400° C. for 4 h, and then heated to 750° C. for 10 h. After crushing and screening, positive electrode particles double-doped with Mg and Ti in outer layers were obtained. The particle size D50 of each particle was 5.0 μm.

Comparative Example 6

A positive electrode active material precursor $[Ni_xCo_y M_{1-x-y}](OH)_2$, $LiOH_2$, and MgO were added into a mixer for mixing, where the Li/Me molar ratio was 1.05, and Me represented the sum of the molar masses of Ni, Co, and Mn in the positive electrode active material precursor. MgO was added in an amount such that the Mg content in the inner layer of the positive electrode material was 2,000 ppm. The mixture was sintered in an oxygen atmosphere sintering furnace, sintered at 400° C. for 4 h, and then heated to 850° C. for 12 h. After crushing and screening, positive electrode particles doped with Mg in the inner layer were obtained. The particle size D50 of each particle=4.0 µm.

Comparative Example 7

A positive electrode active material precursor $[Ni_xCo_y M_{1-x-y}](OH)_2$ and $LiOH_2$ were added into a mixer for mixing, where the Li/Me molar ratio was 1.05, and Me represented the sum of the molar masses of Ni, Co, and Mn in the positive electrode active material precursor. The mixture was sintered in an oxygen atmosphere sintering furnace, sintered at 400° C. for 4 h, and then heated to 750° C. for 10 h. After crushing and screening, positive electrode particles with no doping in the inner layer were obtained.

The above-prepared positive electrode particles and $TiO_2$ were added into the mixer for mixing, where the amount of $TiO_2$ added was such that the content of Ti in the outer layer of the positive electrode material was 1,500 ppm. The mixture was sintered in an oxygen atmosphere sintering furnace, sintered at 400° C. for 4 h, and then heated to 750° C. for 10 h. After crushing and screening, positive electrode particles doped with Ti in the outer layer were obtained. The particle size D50 of each particle was 4.0 µm.

The prepared positive electrode active material was prepared into a battery according to the following process steps:

(1) Preparation of Positive Electrode Sheet

The prepared positive electrode active material, conductive agent acetylene black, and binder PVDF were mixed at a mass ratio of 96:2:2, the solvent NMP was added, and the system was stirred under the action of a vacuum mixer until the system was uniform to obtain a positive electrode slurry. The positive electrode slurry was evenly coated on both surfaces of a positive electrode current collector aluminum foil, dried at room temperature, transferred to an oven for further drying, and then cold pressed and cut to obtain a positive electrode sheet.

(2) Preparation of Negative Electrode Sheet

Negative electrode active material graphite or mixtures of graphite and other active materials in different mass ratios, conductive agent acetylene black, thickener CMC, and binder SBR were mixed in a mass ratio of 96.4:1:1.2:1.4, solvent deionized water was added, and the system was stirred under the action of a vacuum mixer until the system was uniform to obtain a negative electrode slurry. The negative electrode slurry was evenly coated on both surfaces of a negative electrode current collector copper foil, dried at room temperature, transferred to an oven for further drying, and then cold pressed and cut to obtain a negative electrode sheet.

(3) Preparation of Electrolyte Solution

Ethylene carbonate (EC), ethyl methyl carbonate (EMC), and diethyl carbonate (DEC) were mixed according to the volume ratio 1:1:1 to obtain an organic solvent. Next, the fully dried lithium salt $LiPF_6$ was dissolved in the above-mentioned organic solvent, and an electrolyte solution with a concentration of 1 mol/L was prepared.

(4) Preparation of Separator Film

A polyethylene film was selected as the separator film.

(5) Preparation of Li-ion Battery

The abovementioned positive electrode sheet, the separator film, and the negative electrode sheet were stacked in sequence so that the separator film was located between the positive and negative electrode sheets for isolation, and then wound to obtain a bare cell. The bare cell was placed in a battery casing, and the electrolyte solution was injected after drying. The lithium-ion battery was obtained through processes such as vacuum packaging, standing still, formation, and shaping.

Performance or Parametric Testing:

A method for testing electrical performance was performed as follows:

Testing of Capacity Performance: At 25° C., the voltage range was set to 2.75V to 4.3V, the prepared battery was charged and discharged at a rate of 0.33C, the charging and discharging capacity of the first cycle was recorded, and the gram capacity was calculated according to the mass of the positive active material in the positive electrode coating.

Testing of Storage and Gas Production:

Using a drainage method to test the volume of the battery before storing the prepared battery at 25° C. was specifically performed as follows: 1) The battery was charged to full charge. 2) The container was filled with an appropriate amount of deionized water, and the container containing the liquid was placed on the electronic balance and tared. 3) The battery was hung on the tooling with thin wires, and the thin wires were hung on the iron stand. The entire battery was immersed in the solution together with the tooling to ensure that the battery cell was not in contact with the wall and bottom of the container. After it was stable for 10 seconds, m was read and recorded. 4) The battery volume V before storage was calculated: battery volume $V=m/\rho$, where: V—battery volume, m—testing mass by drainage method, and ρ—water density.

After the battery volume testing was completed, the battery surface was cleaned. The battery was placed in a constant temperature box at 70° C. for 4 days. After standing still, the battery was taken out, and after the surface temperature of the battery dropped to room temperature, the volume of the stored battery was measured according to the same method as above, which was recorded as V1. The battery storage volume change rate was $(V1-V)/V*100\%$.

Testing of High Temperature Cycle Capacity Retention:

In a 45° C. incubator, the lithium-ion batteries prepared in Examples and Comparative Examples were subjected to a cycle test according to the following procedure: In the voltage range of 2.75V to 4.3V, it was fully charged at a rate of 1C, and the cycle capacity retention rate was recorded when the number of cycles reached 1,000. The capacity retention rate was the battery discharging capacity at 1,000 cycles divided by the battery discharging capacity at the first cycle.

Testing of Content of First Metal Element M and Second Metal Element N: An inductively coupled plasma-optical emission spectrometer (ICP-OES) was used to test the content of the metal elements M and N in the material. At least 5 g of positive electrode active material samples were taken, and the mass was weighed and recorded before being put into the digestion tank. 10 ml of aqua regia was used as a digestion reagent and was then put into a microwave digestion apparatus for digestion at a specific frequency. The digested solution was transferred to a volumetric flask, added with water, shaken to a constant volume, and then put into an ICP system to test the element content. The plasma radio frequency power was 1,300 W, and the working gas was high-purity argon.

Detecting of Positions of First Metal Element M and Second Metal Element N: 2.5 grams of positive electrode active material samples were taken, and the samples were evenly sprinkled on the sample stage with conductive glue, and at the same time, a certain pressure was lightly pressed to fully fix the samples. The sample stage was placed in the vacuum sample chamber and fixed. The 1061 SEM Mill instrument of the US FISCHIONE company was used to prepare the cross-section of the positive electrode active material, and the relative position of the elements M and N was tested with EDS Mapping.

and elements with higher valence states are introduced. In order to ensure local potential balance, part of $Ni^{3+}$ is reduced to $Ni^{2+}$, the lithium-nickel intermixing is increased, and the capacity cycle performance is lowered.

From the results of Examples 1 to 5 and Comparative Examples 3 to 7, it can be seen that the double modification effect of doping the low-valence state metal element M in the inner layer and doping the high-valence state metal element N in the outer layer is more effective than the single-element doping modification effect. Further, the metal element M in the low-valence state inhibits the lithium-

TABLE 1

| | Metal M Content of First Doping | Metal N Content of Second Doping | Type of M | Type of N | D50 | Gram Capacity (mAh) | Performance 1 (Storage and Gas Production) | Performance 2 (High Temperature Cycle Capacity Retention) |
|---|---|---|---|---|---|---|---|---|
| No. | | | | | | | | |
| Example 1 | 1,000 ppm | 500 ppm | Al | W | 2.0 | 194.5 | 15.1% | 91.64% |
| Example 2 | 2,000 ppm | 1,500 ppm | Al | W | 5.0 | 194.0 | 10.2% | 92.26% |
| Example 3 | 3,000 ppm | 2,500 ppm | Al | W | 8.0 | 192.0 | 8.2% | 91.3% |
| Example 4 | 1,500 ppm | 700 ppm | Al | W | 3.0 | 194.5 | 12.3% | 92.14% |
| Example 5 | 2,500 ppm | 1,800 ppm | Al | W | 6.0 | 193.5 | 8.7% | 92.97% |
| Example 6 | 2,500 ppm | 1,800 ppm | Na | Zr | 4.0 | 193.4 | 8.5% | 91.8% |
| Example 7 | 2,500 ppm | 1,800 ppm | Zn | La | 4.0 | 192.1 | 9.1% | 93.4% |
| Comparative Example 1 | 800 ppm | 400 ppm | Al | W | 5.0 | 195.0 | 19.5% | 89.89% |
| Comparative Example 2 | 3,500 ppm | 2,000 ppm | Al | W | 5.0 | 191.0 | 10.3% | 89.85% |
| Comparative Example 3 | 2,000 ppm | 1,500 ppm | W | Al | 5.0 | 194.0 | 16.5% | 90.5% |
| Comparative Example 4 | 2,000 ppm | 1,500 ppm | Mg, Ti | / | 5.0 | 194.0 | 20.5% | 90.5% |
| Comparative Example 5 | 2,000 ppm | 1,500 ppm | / | Mg, Ti | 5.0 | 194.0 | 16.5% | 89.0% |
| Comparative Example 6 | 2,000 ppm | / | Mg | / | 4.0 | 194.0 | 25.5% | 89.0% |
| Comparative Example 7 | / | 1,500 ppm | / | Ti | 4.0 | 194.5 | 16.5% | 88.0% |

Test Results of Examples 1 to 5 and Comparative Examples 1 to 7

As can be seen from Table 1, in the ternary positive electrode material particle with a higher nickel content, by doping the first metal element M in the inner layer and doping the second metal element N in the outer layer and the elements M and N are each selected specific element types, the lithium battery has a higher initial gram capacity and has higher high-temperature cycle performance and high-temperature storage performance.

As can be seen from the comparative results of Examples 1 to 7, when the inner layer of the ternary active material is doped with an appropriate content of the low-valence metal element M, an appropriate amount of Li+ sites are occupied, the lithium-nickel intermixing is weakened, supporting is provided, and the structure of the material is stabilized. An excessive content may lead to excessive occupied Li+ sites, the effective delithiation amount may be reduced, and the capacity may be lowered. However, if the doping amount of M is excessively small, the effect of improving the bulk phase structure is not good, and the limiting effect on the lithium-nickel intermixing is lowered.

By doping the outer layer of the ternary active material with an appropriate content of high-valence metal element N, the strength of the TM-O bond can be enhanced, the formation of oxygen vacancies can be suppressed, the structural stability is enhanced, and the oxygen precipitation of the lattice is reduced. If the content of N element is excessively small, the confinement effect on oxygen vacancies may be weakened. Excessive N elements replace Ni sites, nickel intermixing and stabilizes the bulk phase structure, and the element N in the high-valence state enhances the bond strength of TM-O, reduces the precipitation of active oxygen, and improves gas production.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A ternary positive electrode active material in a form of particles, wherein an area of 1 nm to 1,000 nm in a direction from an outermost surface to a center in a cross-section of each of the particles is defined as an outer layer, and the rest area in the cross-section of each of the particles is defined as an inner layer, wherein the inner layer is doped with a first metal element M, the outer layer is doped with a second metal element N, and a valence state of the first metal element M is lower than a valence state of the second metal element N, wherein the first metal element M is selected from one or more of Na, K, Mg, Zn, Cu, and Ca, wherein the second metal element N is selected from one or more of Ta, Nb, Mo, Ru, Rh, Pd, and Sb, a structural formula of the positive electrode active material is $LiNi_xCo_yMn_{1-x-y}$, $0<x<1$, $0<y<1$, and $0<x+y<1$.

2. The ternary positive electrode active material according to claim 1, wherein the first metal element M is Mg, or Zn, and the second metal element N is Mo.

3. The ternary positive electrode active material according to claim 1, wherein a mass content of the first metal element M in the ternary positive electrode material is 1,000 ppm to 3,000 ppm.

4. The ternary positive electrode active material according to claim 3, wherein the mass content of the first metal element M in the ternary positive electrode material is 1,500 ppm to 2,500 ppm.

5. The ternary positive electrode active material according to claim 1, wherein a mass content of the second metal element N in the ternary positive electrode material is 500 ppm to 2,500 ppm.

6. The ternary positive electrode active material according to claim 5, wherein the mass content of the second metal element N in the ternary positive electrode material is 700 ppm to 1,800 ppm.

7. The ternary positive electrode active material according to claim 1, wherein a D50 of the particles is 2.0 μm to 8.0 μm.

8. The ternary positive electrode active material according to claim 1, wherein a BET specific surface area of the particles is 0.3 $m^2/g$ to 1.3 $m^2/g$.

9. A lithium-ion battery, comprising the ternary positive electrode active material according to claim 1.

* * * * *